US 6,993,677 B1

(12) United States Patent
Wilner

(10) Patent No.: US 6,993,677 B1
(45) Date of Patent: Jan. 31, 2006

(54) SYSTEM AND METHOD FOR DATA VERIFICATION IN A RAID SYSTEM

(75) Inventor: Alden R. Wilner, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 543 days.

(21) Appl. No.: 09/881,584

(22) Filed: Jun. 14, 2001

(51) Int. Cl.
*G06F 11/00* (2006.01)
(52) U.S. Cl. .............................. 714/6; 714/797; 714/42
(58) Field of Classification Search ................. 714/54, 714/42, 6, 797, 819; 711/114
See application file for complete search history.

(56) References Cited

U.S. PATENT DOCUMENTS

| 5,128,944 A | * | 7/1992 | Flaherty et al. ................. 714/6 |
| 5,432,922 A | * | 7/1995 | Polyzois et al. ................ 714/6 |
| 6,141,770 A | * | 10/2000 | Fuchs et al. .................... 714/11 |
| 6,154,872 A | * | 11/2000 | Jones .......................... 714/797 |
| 6,910,178 B1 | * | 6/2005 | Kiselev et al. .............. 714/819 |
| 2003/0167439 A1 | * | 9/2003 | Talagala et al. ............ 714/770 |

* cited by examiner

*Primary Examiner*—Scott Baderman
(74) *Attorney, Agent, or Firm*—Suiter-West-Swantz PC LLO

(57) ABSTRACT

The present invention is directed to a system and method for data verification in a RAID system. A method of verifying data in a RAID system may include reading a first item of data from a first data storage device and a second item of data from a second data storage device. The first item of data from the first storage device is compared with the second item of data from the second storage device. If the first item of data does not match the second item of data, a third item of data is read from a third data storage device. The third item of data is compared with the first item of data and the second item of data.

14 Claims, 5 Drawing Sheets

SYSTEM AND METHOD FOR DATA VERIFICATION IN A RAID SYSTEM

FIELD OF THE INVENTION

The present invention generally relates to the field data storage systems, and particularly to a system and method for data verification in a RAID system.

BACKGROUND OF THE INVENTION

The efficient and persistent storage of electronic data is one of the most important aspects of modem business. Electronic data may contain information from all aspects of business and life in general. Therefore, data must not only be stored efficiently and effectively, but that data must also be stored in a manner to ensure the veracity of the data. Corruption of this data may have enormous consequences, especially in instances in which the error is not "caught", which may cause incorrect results and further inefficiencies. One method and system utilized to promote data integrity is a redundant array of inexpensive disks (RAID) system, which may provide a group of drives in a system that will continue to provide access to data even in the event of drive failure. However, data corruption may still occur in a RAID system. For example, data corruption has occurred in the past because disk drives had erroneously reported successful completion of WRITE commands that had not, in fact, been successfully completed. This may occur due to disk drive vendor defects, and the like.

Additionally, some controllers of RAID system may not handle "unreliable drive" type errors. One method of addressing this problem was to rely on rigorous pre-certification of disk drives, but such a reliance may be unsuitable as certain manufacturers may desire further guarantees of drive reliability. Other methods utilized to address this problem include a separate "data scrubber" process, issue all write requests with verify requested, calculate and store a CRC along with the data, and the like. However, these solutions may involve significant performance degradation. Further, the inclusion of CRC may require specialized CRC hardware in order to avoid performance degradation, thereby making such an option unsuitable for existing devices and may require extensive modifications.

Therefore, it would be desirable to provide a system and method for data verification in a RAID system.

SUMMARY OF THE INVENTION

Accordingly, the present invention is directed to a system and method for data verification in a RAID system. In a first aspect of the present invention, a method of verifying data in a RAID system includes reading a first item of data from a first data storage device and a second item of data from a second data storage device. The first item of data from the first storage device is compared with the second item of data from the second storage device. If the first item of data does not match the second item of data, a third item of data is read from a third data storage device. The third item of data is compared with the first item of data and/or the second item of data.

In a second aspect of the present invention, an electronic data storage system includes a first data storage device, a second data storage device, a third data storage device and a storage device controller. The first data storage device is suitable for storing electronic data and includes a first item of data. Likewise, the second data storage device is also suitable for storing electronic data and includes a second item of data, and the third data storage device includes a third item of data. A storage device controller is coupled to the first data storage device, the second data storage device and the third data storage device. The storage device controller reads a first item of data from a first data storage device and a second item of data from a second data storage device and compares the first item of data from the first storage device with the second item of data from the second storage device. If the first item of data does not match the second item of data, the third item of data is read from the third data storage device and the third item of data is compared with at least one of the first item of data and the second item of data.

In a third aspect of the present invention, a method of verifying data in a RAID system includes reading a first item of data from a first data storage device and a second item of data from a second data storage device. The first item of data from the first storage device is compared with the second item of data from the second storage device. If the first item of data does not match the second item of data, a third item of data is read from a third data storage device and compared with the first item of data. If the third item of data matches the first item of data, the second item of data is updated.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally now to FIGS. 1 through 4B, exemplary embodiments of the present invention are shown. One method and system utilized to promote data integrity is a redundant array of inexpensive disks (RAID) system, which may provide a group of drives in a system that will continue to provide access to data even in the event of drive failure. However, data corruption may still occur in a RAID system. For example, data corruption may occur wherein disk drives erroneously report successful completion of WRITE commands that had not, in fact, been successfully completed. This may occur due to disk drive vendor defects, and the like. Additionally, some controllers of RAID system may not handle "unreliable drive" type errors. By providing a system and method for data verification in a RAID system, data integrity may be further promoted, even over the advantages typically provided in a RAID system.

Figure 1:
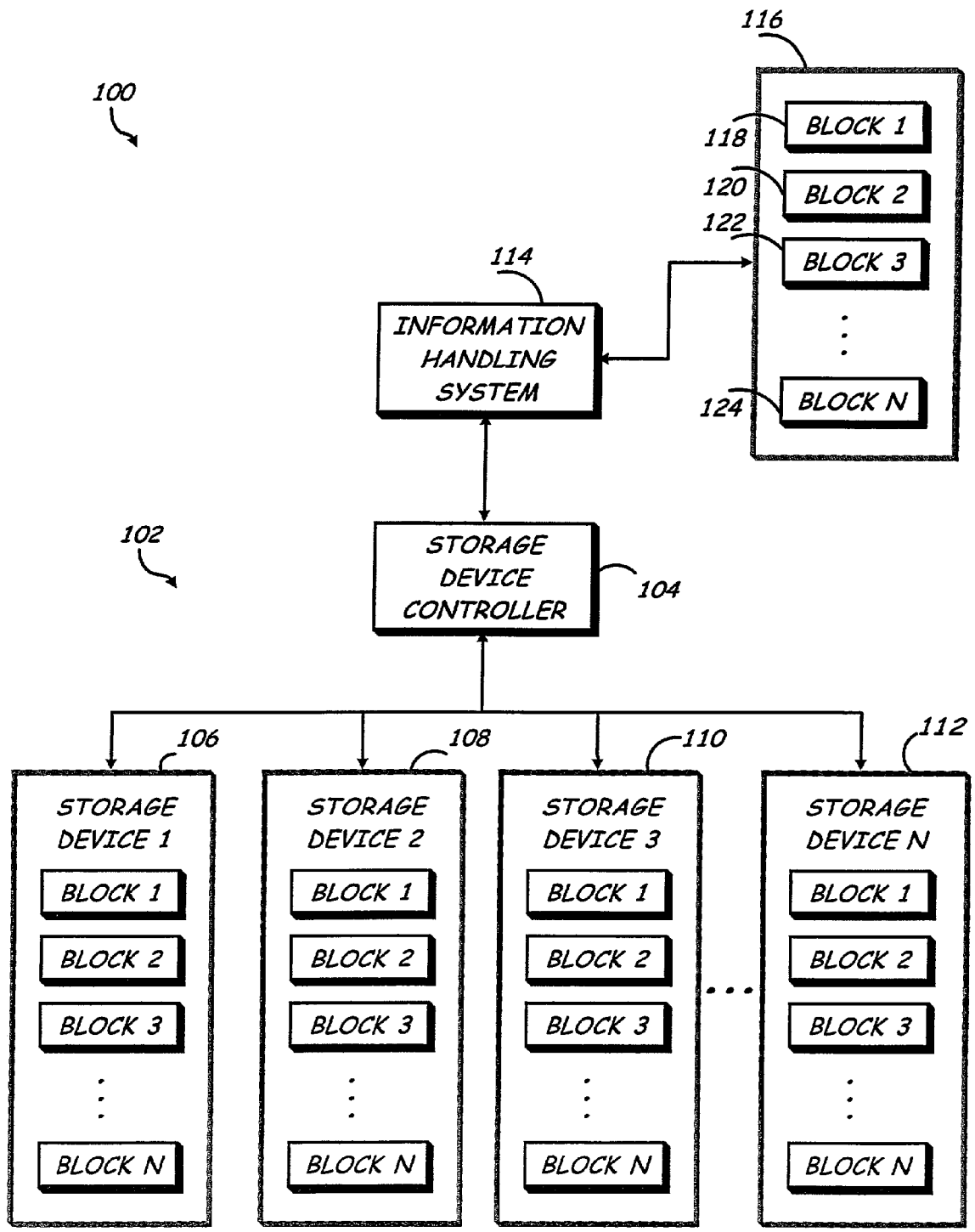
FIG. 1 is a block diagram illustrating an embodiment of the present invention wherein an information handling system is coupled to an electronic data storage system includes a first data storage device, a second data storage device and a third data storage device each of which have corresponding items of data stored thereon.

Referring now to FIG. 1, an embodiment 100 of the present invention is shown wherein an information handling system is coupled to an electronic data storage system, which includes a first data storage device, a second data storage device and a third data storage device having corresponding items of data stored thereon. An electronic data storage system 102 may include a storage device controller 104 and a plurality of storage devices, such as storage device 1 106, storage device 2 108, storage device 3 110 and up to storage device N 112. Writing data to the storage devices 106, 108, 110 & 112 simultaneously may be utilized to mirror data. For example, an information handling system 114, such as a server, desktop computer, and the like, may receive an initial set of data 116 including block 1 118, block 2 120, block 3 122 and block n 124 and wish to store that data in a persistent manner on an electronic data storage system 102. The storage device controller 104 receives the initial set of data 116 and sends the data to the storage devices 106, 108, 110 & 112. The storage devices 106, 108, 110 & 112 then write the data, so that each storage device has a corresponding copy of the initial set of data. Thus, if a storage device became inaccessible, such as storage device 1 106, data may be retrieved from a second storage device, such as storage device 2 108. Such a method of data saving includes RAID 1. However, a storage device failure may occur wherein the data on the storage devices becomes corrupted. For example, a storage device may appear to be operating within parameters, but in actual operation does not perform the write function successfully. Thus, a corrupted data condition may occur, which may result in incorrect data results, errors, and the like. By utilizing the present invention, data may be verified by comparing the data stored on the storage devices. In this way, corrupted data may be identified and even corrected.

Figure 2:
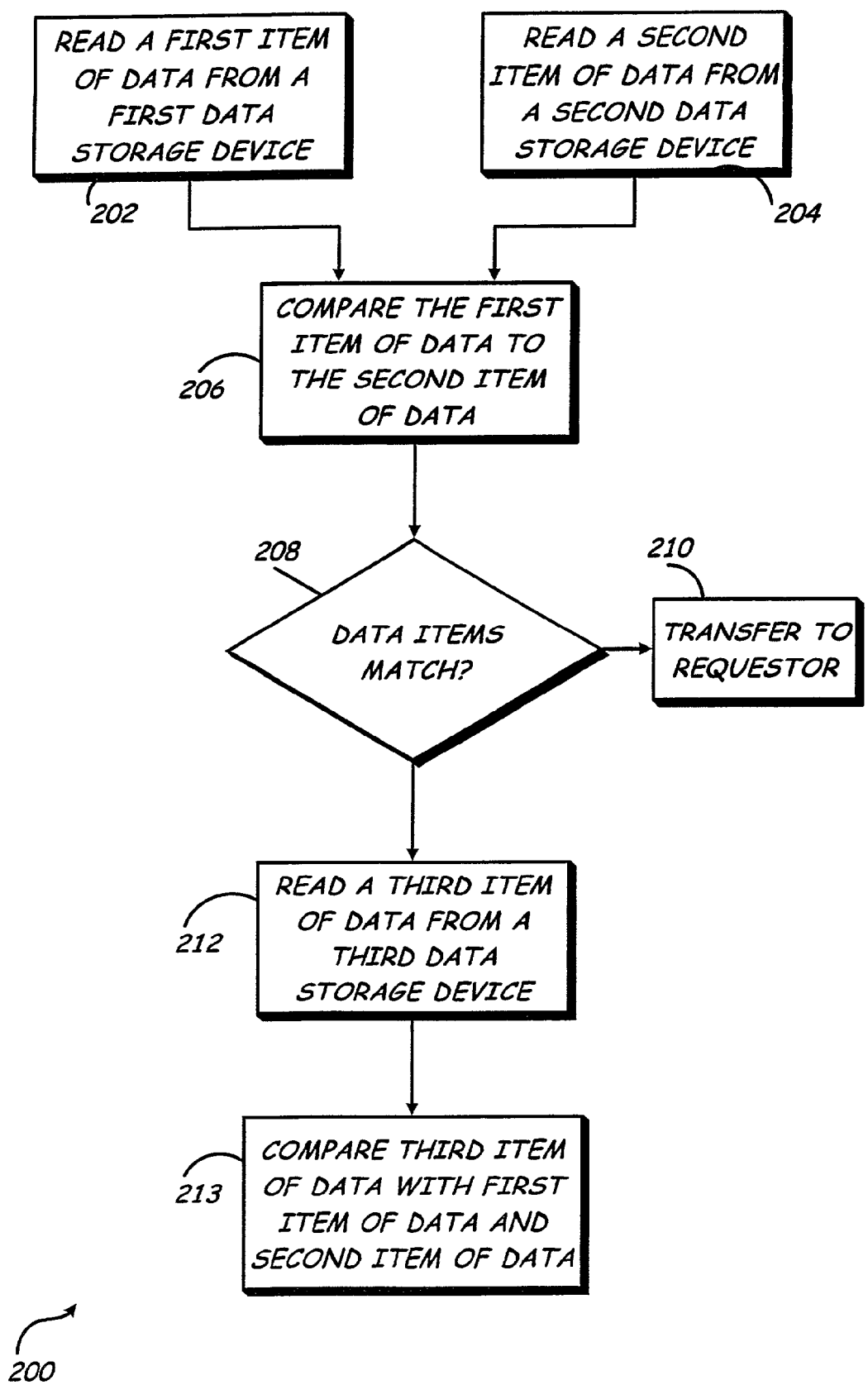
FIG. 2 is a flow diagram depicting an exemplary method of the present invention wherein a first item of data read from a first data storage device is compared to a second item of data read from a second storage device, and if the data items do not match, the data items are compared with a third item of data from a third data storage device.

Referring now to FIG. 2, an exemplary method 200 of the present invention is shown wherein a first item of data read from a first data storage device is compared to a second item of data read from a second storage device, and if the data items do not match, the data items are compared with a third item of data from a third data storage device. A first item of data is read from a first data storage device 202 and a second item of data is read from a second data storage device 204. The first item of data is compared with the second item of data 206. If the data items match 208, a matching data item may be transferred to the requestor 210, such as the information handling system 114 as shown in FIG. 1 and the like. However, if the data items do not match, a third item of data is read from a third data storage device 212. The third item of data is compared with the first item of data and the second item of data 214. In this way, the present invention may be implemented as software on an ordinary operating system, by a disk array controller, and the like as contemplated by a person of ordinary skill in the art so that specialized hardware is not needed. Comparing the third item of data with the first item of data and the second item of data may be utilized in a variety of ways to verify data and to arrive at an uncorrupted data item.

Figure 3:
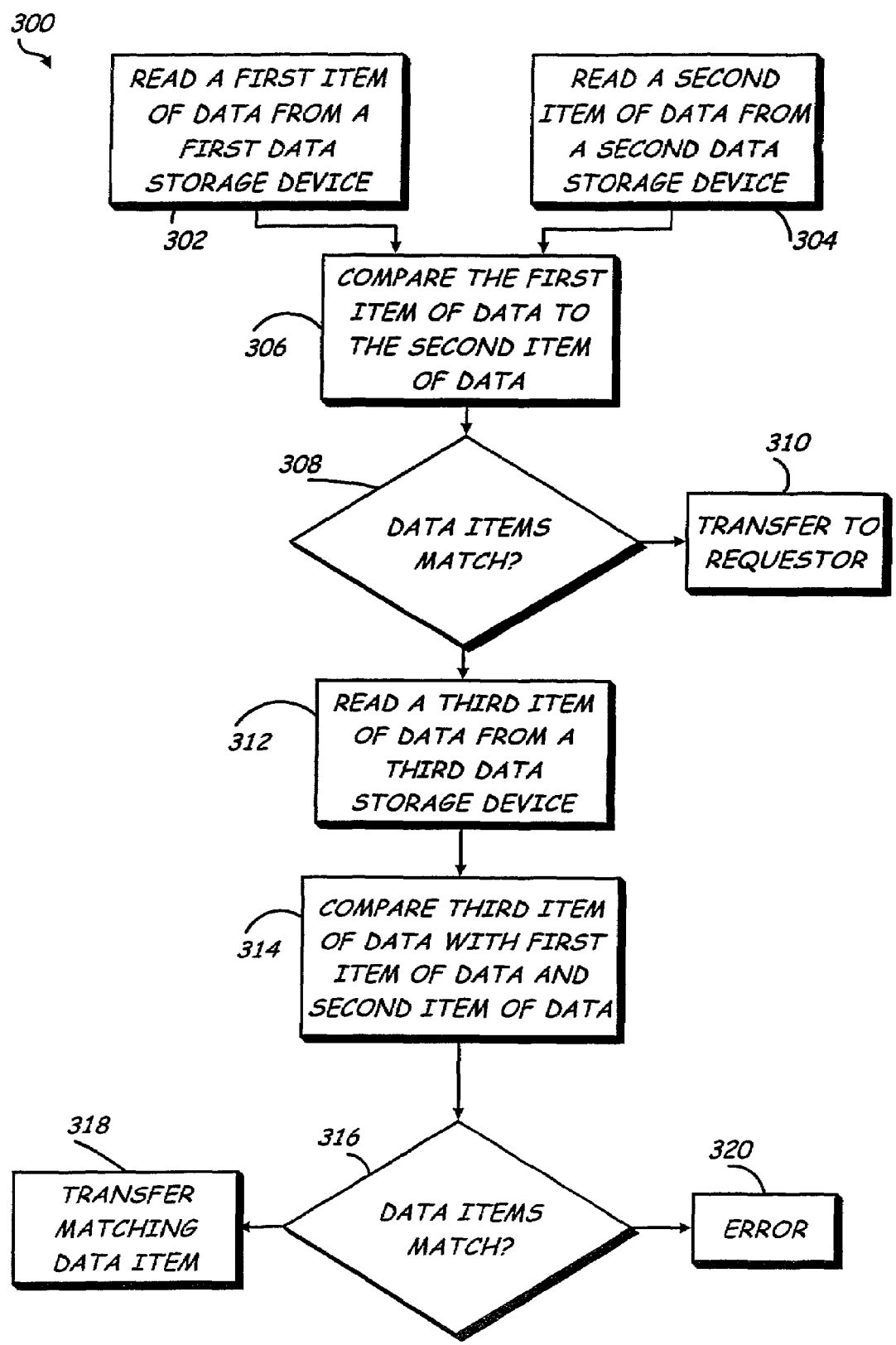
FIG. 3 is a flow diagram depicting an exemplary method of the present invention wherein nonmatching data items are compared with a third data item to determine the uncorrupted data item which is then transferred.

For example, as shown in the exemplary method 300 depicted in FIG. 3, nonmatching data items are compared with a third data item to find an uncorrupted data item, which is then transferred. A first item of data is read from a first data storage device 302, such as the storage device 1 106 depicted in FIG. 1. Likewise, a second item of data is read from a second storage device 304, such as storage device 2 108 depicted in FIG. 1. If the first item of data from the first storage device matches the second item of data from the second storage 308, the item of data may be transferred to the requesting device 310. However, if the data items do not match 308, a third item of data is read from a third data storage device 312. The third data item is compared 314 with the first item of data and/or the second item of data. If the third item of data matches 316 either the first item of data or the second item of data, the matching data item is transferred 318. However, if the third item of data does not match either the first item of data or the second item of data, an error result may be sent 320. In this way, a simple majority vote may be used to verify that the data is correct.

Figure 4A:
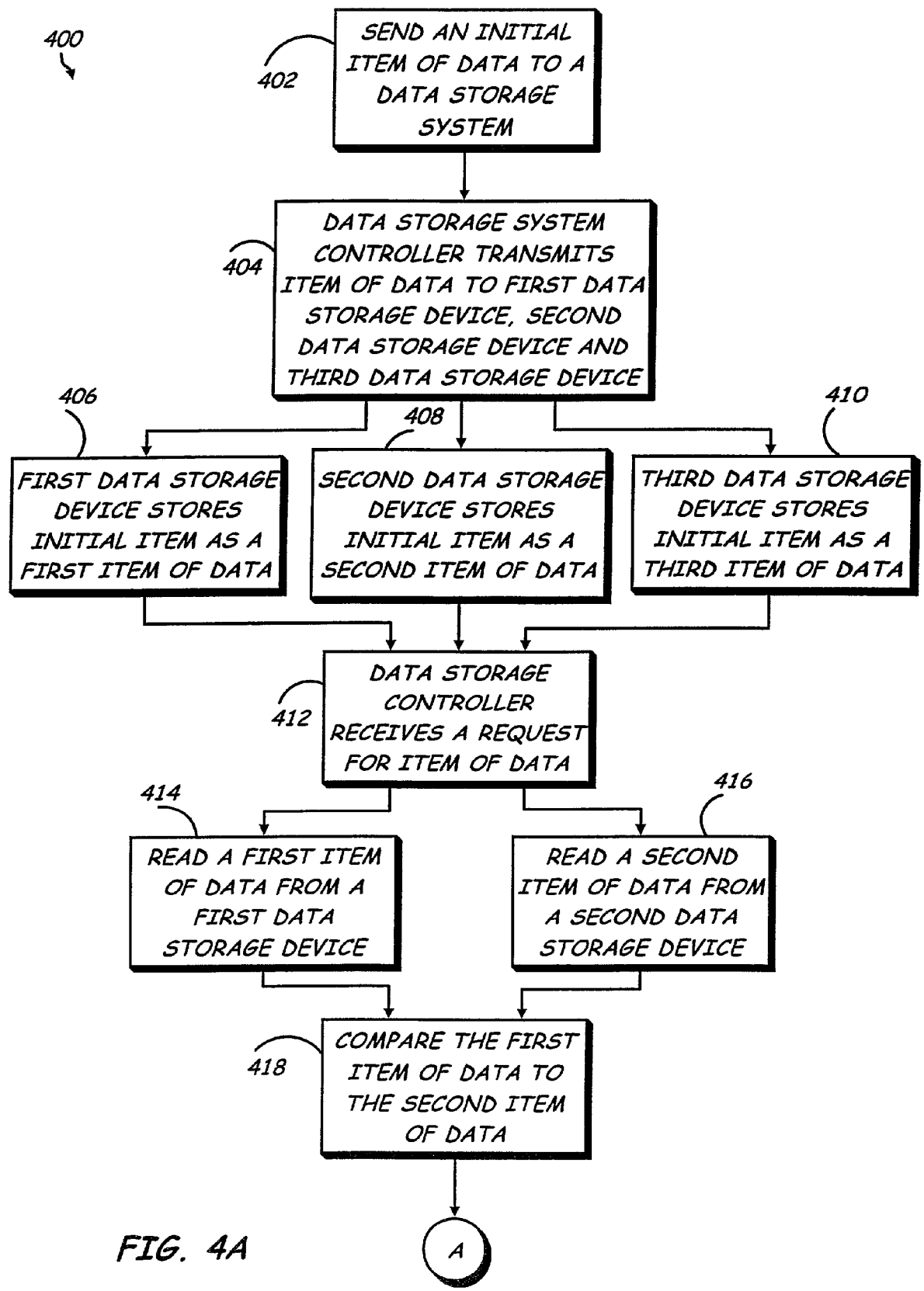
FIGS. 4A and 4B are flow diagrams illustrating an exemplary method of the present invention wherein data from three data storage devices is compared in the event that data from the first data storage device and the second data storage device does not match, wherein the items of data which match are utilized to update the nonmatching data item.
Figure 4B:
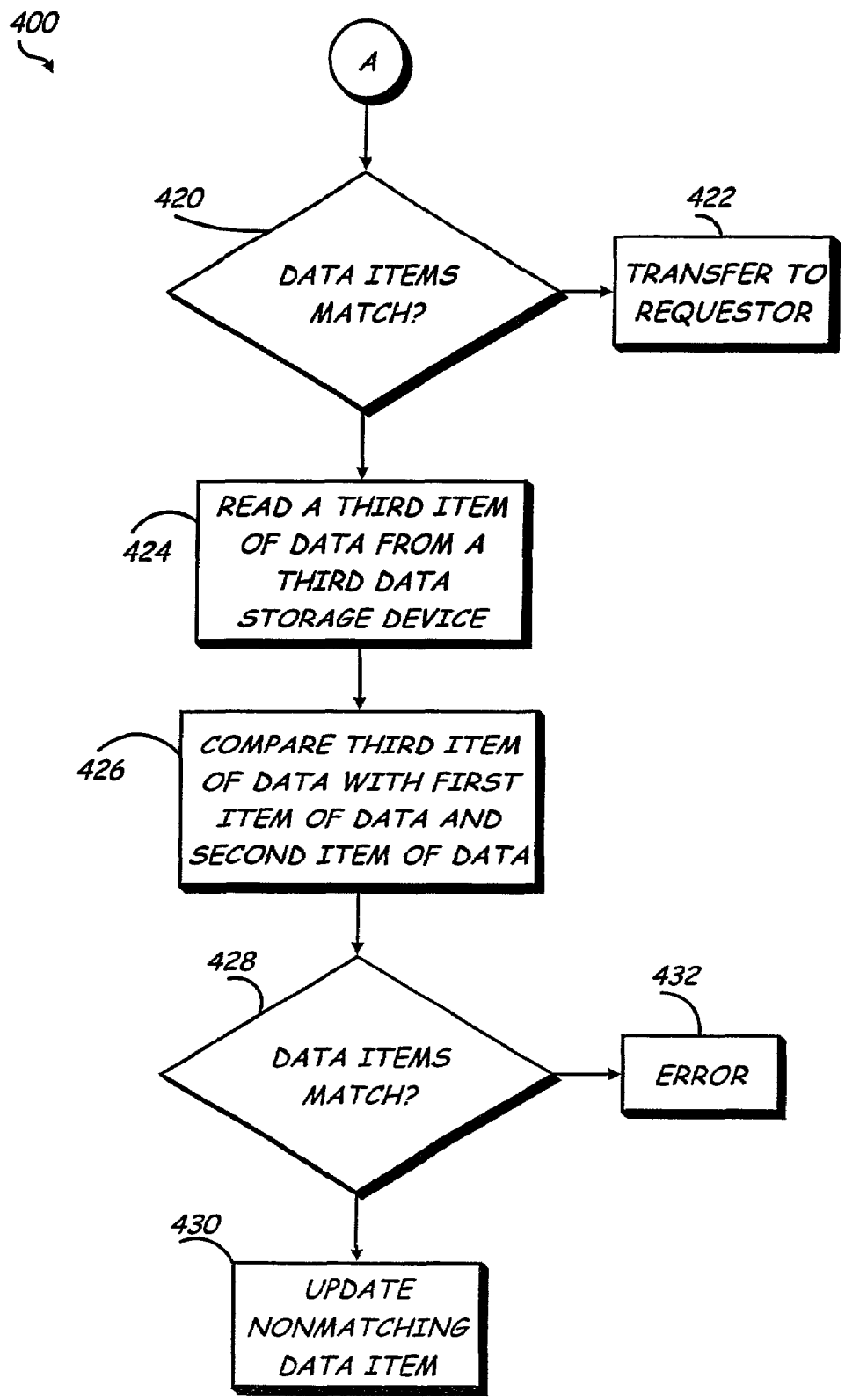

Referring now to FIGS. 4A and 4B, an exemplary method 400 of the present invention is shown wherein data from three data storage devices is compared in the event that data from the first data storage device and the second data storage device does not match, wherein the items of data which match are utilized to update the nonmatching data item. An initial item of data is sent to a data storage system 402. A data storage system controller transmits the item of data to a first data storage device, a second data storage device and a third data storage device 404, such as disk drives configured in a RAID 1 array. The first data storage device stores the initial item of data as a first item of data 406. Likewise, the second data storage device stores the initial item of data as a second item of data 408, and the third data storage devices stores the initial item of data as a third item of data 410. Thus, when a data storage controller receives a request for an item of data 412, a first item of data is read from a first data storage device 414 and a second item of data is read from a second data storage device 416. The first item of data is then compared to the second item of data 418. If the data items match 420, a matching item is transferred to the requestor 422. If the data items do not match 420, a third item of data is read from a third data storage device 424. The third item of data is compared with the first item of data and the second item of data 426. If the third data item matches either the first data item or the second data item 428, the nonmatching data item is updated to match 430. However, if the third data item does not match either the first data item or the second data item, an error message is sent 432.

In additional embodiments of the present invention, the third data item may be compared with the first data item, and if the items do not match, the third data item is compared with the second data item, and the like methods of comparison as contemplated by a person of ordinary skill in the art.

Further, it may be desirable to compare the first data item, second data item and/or third data item to an additional data item stored on an additional storage device, such as up to storage device n as shown in FIG. 1. In this way, any number of storage devices may be utilized to perform the data verification as contemplated by the present invention without departing from the spirit and scope thereof. For instance, in implementations in which data integrity is at a premium, a larger number of storage devices may be utilized to compare corresponding data items.

Although the invention has been described with a certain degree of particularity, it should be recognized that elements thereof may be altered by persons skilled in the art without departing from the spirit and scope of the invention. One of the embodiments of the invention can be implemented as sets of instructions resident in the memory of one or more information handling systems. Until required by an information handling system, the set of instructions may be stored in another readable memory device, for example in a hard disk drive or in a removable memory such as an optical disc for utilization in a CD-ROM drive, a floppy disk for utilization in a floppy disk drive, a floppy/optical disc for utilization in a floppy/optical drive, or a personal computer memory card for utilization in a personal computer card slot. Further, the set of instructions can be stored in the memory of an information handling system and transmitted over a local area network or a wide area network, such as the Internet, when desired by the user. Additionally, the instructions may be transmitted over a network in the form of an applet that is interpreted or compiled after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

In exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the system and method for data verification of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method of verifying data in a RAID system, comprising:
    writing an item of data to a first data storage device, a second data storage device, and a third data storage device simultaneously, the item of data being stored as a first item of data of the first data storage device, a second item of data of the second data storage device, and a third item of data of the third data storage device, the first data storage device, the second storage device and the third storage device being included within a redundant array of inexpensive disks (RAID) system;
    reading the first item of data from the first data storage device and the second item of data from the second data storage device; and
    comparing the first item of data from the first storage device with the second item of data from the second storage device;
    transferring a matching item of data to a requestor when the first item of data matches the second item of data;
    reading the third item of data only when the first item of data and the second item of data do not match, wherein the third item of data is compared with at least one of the first item of data and the second item of data.

2. The method as described in claim 1, wherein if the third item of data matches at least one of the first item of data and the second item of data, transferring a matching item of data.

3. The method as described in claim 1, wherein if the third item of data matches the first item of data, updating the second item of data.

4. The method as described in claim 3, wherein the second item of data is updated to match at least one of the first item of data and the third item of data.

5. The method as described in claim 1, wherein if the third item of data does not match at least one of the first item of data and the second item of data, an error is reported.

6. An electronic data storage system, comprising:
    a first data storage device suitable for storing electronic data, the first storage device including a first item of data;
    a second data storage device suitable for storing electronic data, the second storage device including a second item of data;
    a third data storage device suitable for storing electronic data, the third storage device including a third item of data; and
    a storage device controller coupled to the first data storage device, the second data storage device and the third data storage device, the storage device controller writes an item of data to the first storage device, the second storage device and the third storage device simultaneously, the item of data being stored as the first item of data of the first data storage device, the second item of data of the second data storage device, and the third item of data of the third data storage device, the first data storage device, the second storage device and the third storage device being included within a redundant array of inexpensive disks (RAID) system, the storage device controller reads a first item of data from a first data storage device and a second item of data from a second data storage device and compares the first item of data from the first storage device with the second item of data from the second storage device, the storage controller transfers a matching item of data when the first item of data matches the second item of data, the storage controller reads a third item of data only when the first item of data does not match the second item of data, wherein the third item of data is compared with at least one of the first item of data and the second item of data.

7. The system as described in claim 6, wherein if the third item of data matches the first item of data, at least one of the first item of data and the third item of data is transferred.

8. The system as described in claim 6, wherein if the third item of data matches the first item of data, the second item of data is updated.

9. The system as described in claim 8, wherein the second item of data is updated to match at least one of the first item of data and the third item of data.

10. The system as described in claim 6, wherein if the third item of data does not match at least one of the first item of data and the second item of data, an error is reported.

11. A method of verifying data in a RAID system, comprising:

writing an item of data to a first data storage device, a second data storage device, and a third data storage device simultaneously, the item of data being stored as a first item of data of the first data storage device, a second item of data of the second data storage device, and a third item of data of the third data storage device, the first data storage device, the second storage device and the third storage device being included within a redundant array of inexpensive disks (RAID) system;

reading the first item of data from the first data storage device and the second item of data from the second data storage device; and comparing the first item of data from the first storage device with the second item of data from the second storage device;

transferring a matching item of data to a requestor when the first item of data matches the second item of data;

reading the third item of data only when the first item of data and the second item of data do not match, wherein the third item of data is compared with the first item of data, wherein if the third item of data matches the first item of data, the second item of data is updated.

12. The method as described in claim 11, wherein if the third item of data matches the first item of data, transferring at least one of the first item of data and the third item of data.

13. The method as described in claim 11, wherein the second item of data is updated to match at least one of the first item of data and the third item of data.

14. The method as described in claim 11, wherein if the third item of data does not match at least one of the first item of data and the second item of data, an error is reported.

* * * * *